(12) United States Patent
Saunders et al.

(10) Patent No.: US 9,058,611 B2
(45) Date of Patent: Jun. 16, 2015

(54) SYSTEM AND METHOD FOR ADVERTISING USING IMAGE SEARCH AND CLASSIFICATION

(75) Inventors: Craig John Saunders, Grenoble (FR); Nicolas Guérin, Notre-Dame-de-Mésage (FR); Ruhul Islam, Grenoble (FR); Christine Cayol, Grenoble (FR); Thomas Dalban, Grenoble (FR); Sébastien Dabet, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 244 days.

(21) Appl. No.: 13/050,587

(22) Filed: Mar. 17, 2011

(65) Prior Publication Data

US 2012/0239506 A1   Sep. 20, 2012

(51) Int. Cl.
   *G06Q 30/02* (2012.01)
(52) U.S. Cl.
   CPC ........................... *G06Q 30/02* (2013.01)
(58) Field of Classification Search
   None
   See application file for complete search history.

(56) References Cited

U.S. PATENT DOCUMENTS

| | | | |
|---|---|---|---|
| 6,654,735 B1* | 11/2003 | Eichstaedt et al. | 707/749 |
| 7,657,907 B2 | 2/2010 | Fennan et al. | |
| 7,680,341 B2 | 3/2010 | Perronnin | |
| 7,969,606 B2* | 6/2011 | Chu | 358/1.17 |
| 2003/0021481 A1 | 1/2003 | Kasutani | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0091535 A1* | 4/2008 | Heiser et al. | 705/14 |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2010/0036883 A1 | 2/2010 | Valencia-Campo et al. | |
| 2010/0040285 A1* | 2/2010 | Csurka et al. | 382/170 |
| 2010/0092084 A1 | 4/2010 | Perronnin et al. | |
| 2010/0098343 A1 | 4/2010 | Perronnin et al. | |
| 2010/0169178 A1 | 7/2010 | Wang et al. | |
| 2010/0189354 A1 | 7/2010 | de Campos et al. | |
| 2010/0226564 A1 | 9/2010 | Marchesotti et al. | |

(Continued)

OTHER PUBLICATIONS

Patel, Kuma, "Online Ads not working for you? Blame the Creative", AdAge Digital, posted Oct. 20, 2009, available at: http://adage.com/article/digital/digital-online-ads-working-blame-creative/139795/.*

(Continued)

*Primary Examiner* — Thomas M Hammond, III
*Assistant Examiner* — Katherine Kolosowski-Gager
(74) *Attorney, Agent, or Firm* — Fay Sharpe LLP

(57) ABSTRACT

An advertising system and method are disclosed for generating advertising content based on a user's images. These can be photographs owned by a user of a web page. An advertising template for an advertising sponsor is provided. For a user viewing the web page, a set of the user's images is categorized, based on image content of the images in the set. The categorization is performed with at least one classifier which has been trained on a finite set of image categories. An advertising image is selected for advertising content based on the categorization of the user's images. The template is combined with the selected advertising image to form the advertising content. The advertising content can then be displayed to the user on the web page. A user profile is also disclosed which can be used as the categorized user images.

20 Claims, 10 Drawing Sheets

(56) References Cited

U.S. PATENT DOCUMENTS

| | | | |
|---|---|---|---|
| 2010/0318477 A1 | 12/2010 | Perronnin et al. | |
| 2011/0066492 A1* | 3/2011 | Sumiyoshi et al. | 705/14.49 |
| 2011/0066942 A1* | 3/2011 | Barton et al. | 715/716 |
| 2011/0072047 A1* | 3/2011 | Wang et al. | 707/776 |

OTHER PUBLICATIONS

Matthews, Lee; "Facebook sez, Don't mind us . . . ". Posted Jul. 16, 2009, accessed on Jul. 24, 2014. Additional references regarding the same event provided as supplemental, including "Photo Attorney Q & A, Feb. 17, 2009", "Facebook Note: Debunking rumors . . . Nov. 24, 2009", and "OpinionLA, Facebook can use your photos, Jul. 24, 2009.".*

Perronnin, et al., "Adapted Vocabularies for Generic Visual Categorization," in *European Conf. on Computer Vision*, 2006.

Perronnin, et al. "Fisher Kernels on Visual Vocabularies for Image Categorization," in Proc. of the IEEE Conf on Computer Vision and Pattern Recognition (CVPR), Minneapolis, MN, USA (Jun. 2007).

Csurka, et al., "Visual Categorization with Bags of Key-points," in *ECCV Workshop on Statistical Learning for Computer Vision* (2004).

Quelhas, et al., "Modeling Scenes with Local Descriptors and Latent Aspects," in International Conference on Computer Vision (ICCV), 2005.

Carbonetto, et al., "A Statistical Model for General Contextual Object Recognition," in *ECCV* 2004.

Zheng, et al., "Tour the World: Building a web-scale landmark recognition engine," IEEE Computer Society Conference, 2009.

Jegou, et al., "Improving Bag-of-Features for Large Scale Image Search," in IJCV, 2010.

Berger, et al. "Photo-Based User Profiling for Tourism Recommender Systems," E-Commerce and Web Technologies, Lecture Notes in Computer Science, 2007, vol. 4655/2007, 46-55.

Gammeter, et al. "I know what you did last summer: object-level auto-annotation of holiday snaps," ICCV, Sep. 27, 2009.

Mei, et al. "Contextual In-Image Advertising," MM'08, Oct. 26-31, 2008.

Perronnin, et al., "Large-scale image categorization with explicit data embedding," in CVPR 2010.

www.pixy-the-robot.com/—accessed Dec. 2, 2010.

U.S. Appl. No. 12/512,209, filed Jul. 30, 2009, Perronnin, et al.
U.S. Appl. No. 12/693,795, filed Jan. 26, 2010, Skaff, et al.
U.S. Appl. No. 12/870,983, filed Aug. 30, 2010, Chuat, et al.
U.S. Appl. No. 12/960,018, filed Dec. 3, 2010, Gordo, et al.
U.S. Appl. No. 12/632,107, filed Dec. 7, 2009, Marchesotti, et al.
U.S. Appl. No. 12/890,049, filed Oct. 24, 2010, Skaff, et al.

* cited by examiner

SYSTEM AND METHOD FOR ADVERTISING USING IMAGE SEARCH AND CLASSIFICATION

BACKGROUND

The exemplary embodiment relates to the field of personalized marketing and finds particular application in connection with a system and method for personalizing of advertisements that are presented beside content of a website, such as a social networking site.

Advertising is widely used in the form of popups, banners, and side panels on websites to persuade viewers of the content of those websites to click on the advertisement. This generally actuates a web link to the sponsor's web page where the viewer can purchase products or services offered for sale by the sponsor who has purchased the advertisement or take other actions which are of benefit to the sponsor. The advertisement often includes the name of a product or service or a picture representative of it and also a name or logo identifying the brand of product or service or the sponsor's name.

In the case of social or professional media websites (e.g., social or professional network sites), traffic generation from content, particularly in the form of advertising, is often used as a method of selling a product or increasing awareness of a website or service. The viewer's attention is generally focused on the web page content, rather than the advertisements. Thus, the advertisements are often ignored. Because the sponsor may be charged for the advertising, irrespective of whether the viewer clicks on it to actuate the link, such advertising is typically targeted in order to obtain maximum traffic flow. The content of the advertisements may thus be delivered based on keywords appearing on a user-selected web page, for example. The sponsor could be provided with access to the user's profile, which has been submitted by the user to the website and display advertisements based on that. However, profiles filled in by users of social networking sites do not always accurately portray their interests.

It would be beneficial to be able to provide advertisements which are of interest to the viewer which can be selected in an automatic or semiautomatic manner.

It would also be beneficial to be able to generate a profile for a user of a website in an automatic or semiautomatic manner, which does not need to rely on user input.

INCORPORATION BY REFERENCE

The following references, the disclosures of which are incorporated herein in their entireties by reference, are mentioned:

U.S. Pub. No. 20100036883, published Feb. 11, 2010, entitled ADVERTISING USING IMAGE COMPARISON, by Alexander Valencia-Campo, et al., discloses a method which includes indexing image index files, each image index file being representative of a digital image of an advertisement. When an image query is received, an image index file representative of a digital image in the query is calculated and compared with the image index files representative of the advertisements. An advertisement is transmitted based on the comparison.

U.S. Pub, No. 20100169178, published Jul. 1, 2010, entitled ADVERTISING METHOD FOR IMAGE SEARCH, by Xin-Jing Wang, et al., discloses a method for advertising in response to an image search. A user enters keywords for searching one or more images on a network. An advertisement is then selected based on the visual content of the images and the visual content of the advertisements and displayed to the user.

U.S. Pat. No. 7,657,907, issued Feb. 2, 2010, entitled AUTOMATIC USER PROFILING, by A. Mufit Fennan, et al., discloses a method of describing video content which includes receiving a profile that contains a plurality of weighted preferences that have non-binary values that together describe video content that is potentially desirable to a user. A mapping table is used to combine some of the preferences into a single test that is applied to program content descriptions so as to automatically identify programming preferable to the user.

BRIEF DESCRIPTION

In accordance with one aspect of the exemplary embodiment, an advertising method includes providing an advertising template for an advertising sponsor. An advertising image is selected for advertising content based on a set of the user's images. The template is combined with the selected advertising image to form the advertising content. The method further includes providing for displaying the advertising content to the user on the web page. The displayed advertising content includes a link to the sponsor's web page which is actuatable by the user. Any one or more of the steps of the method may be performed with a computer processor.

In another aspect, an advertising system includes memory which stores an advertising template for an advertising sponsor. Memory stores a categorizer for categorizing a set of a user's images, based on image content. The categorizer includes at least one classifier which has been trained on image signatures of a labeled set of training images, the labels being selected from a finite set of image category labels. A comparison computing component selects an advertising image based on the categorization of the user's images. A combing component combines the template with the selected advertising image to form advertising content which is displayable to the user on a web page viewed by the user. A computer processor implements the categorizer, comparison computing component, and combining component.

In another aspect, a method includes, for a user viewing a web page, generating a user profile. This includes categorizing a set of the user's images, based on image content of the images in the set, with at least one classifier which has been trained on a finite set of image categories. The user profile represents a distribution of the user images over at least a set of the categories. The method further includes performing at least one of: a) selecting an image for an advertisement to be displayed to the user on the web page, based on the user profile; b) displaying information to the user based on the user profile; c) comparing the user profile with a user profile for at least one other user and outputting a decision based on the comparison; d) using the profile in a recommender system to make recommendations to the user; and e) making a financial decision based on the user profile. Any one or more of the steps of the method may be performed with a computer processor.

DETAILED DESCRIPTION

Aspects of the exemplary embodiment relate to a system and method for identifying advertisement content based on analyzing a user's own web content. In particular, one aspect of the system and method are directed to selecting visual advertising elements based on analyzing image content within a user's web page or linked thereto. For example, given the elements of a) an image classifier, b) a method of computing a distance between image content, and c) a user profile obtained from classification of image content appearing on the user's page, advertising content can be generated which is tailored to the user's interests.

Aspects of the exemplary embodiment also relate to a system and method for generating a user profile based on analyzing image content within a user's web page or linked thereto.

Figure 1:
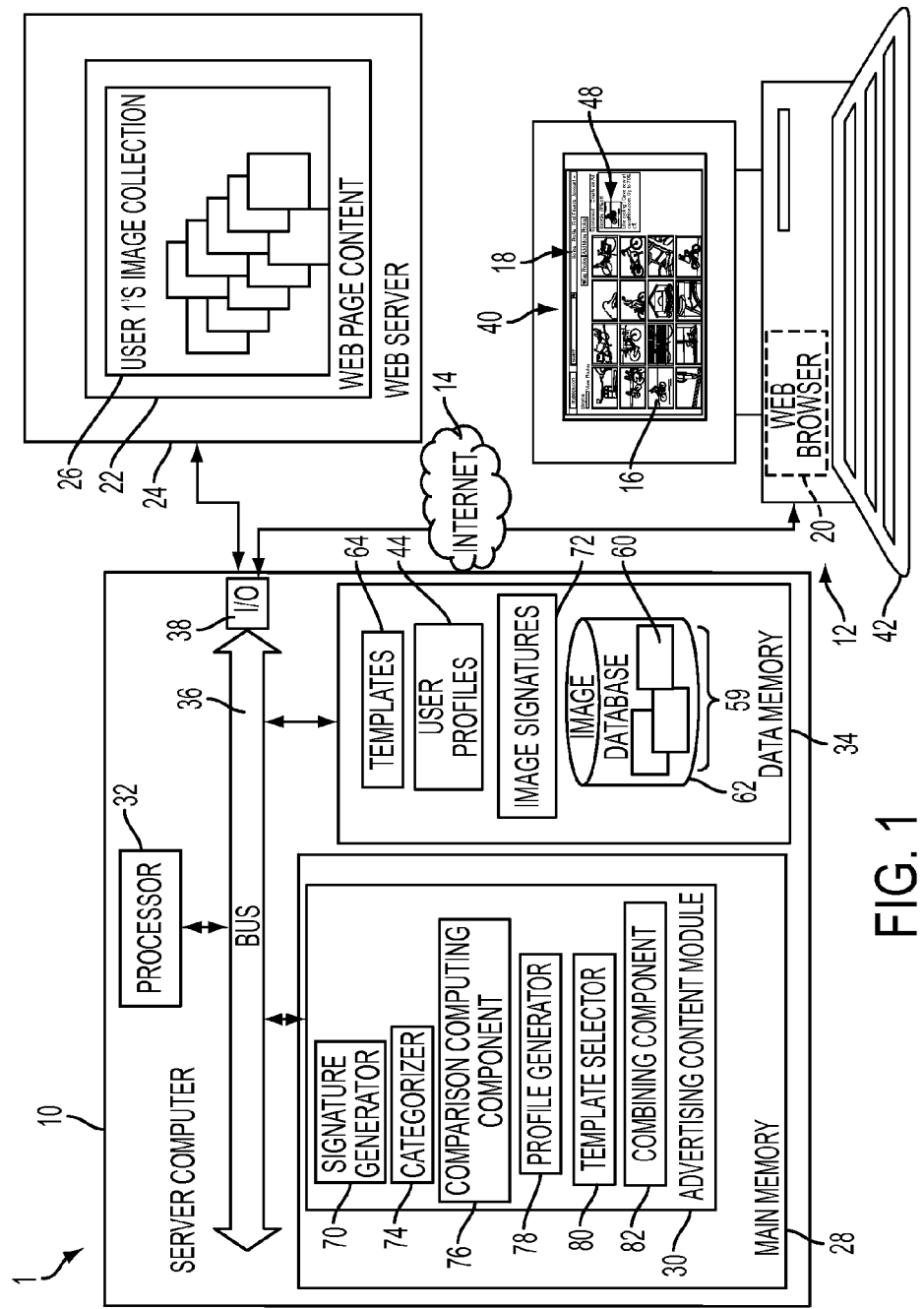
FIG. 1 is a functional block diagram of a system for generating advertising content based on user images.

With reference to FIG. 1, a computer-implemented system 1 for generating personalized advertising content (advertisements) is illustrated. The system may be implemented in one or more computing devices and the exemplary arrangement of computing devices is intended to be illustrative only.

The system 1 includes a server computer 10 which communicates with a client computing device 12 via a wired or wireless connection 14, such as a local area network or wide area network, such as the Internet. A user operating on the client device 12 can view images 16 that are displayed on his personal web page 18. The web page 18 may be accessed using a web browser 20 operating on the client device 12. Content 22 for the web page may be stored on a remote server computer 24, which may also store the user's images 16, which are linked to his personal web page 18. The user may additionally or alternatively store images on his/her own computing device 12 and/or have bookmarked images 16 on another user's webpage or another website. All of these images which are automatically linked or linkable to the specific user will be referred herein to as the user's images 16 and the total set of the user's images (or a portion thereof selected as being representative of the user's images) is referred to herein as the user's image collection 26.

The methods disclosed herein are particularly suited to photographs stored by the user on social networking websites, such as Facebook™, LinkedIn™, and MySpace™, or on online image sharing sites, such as Flickr™ and Picasa™. The website to which the user's photos have been uploaded may provide access to the images to a third party advertising sponsor or may itself be the advertising sponsor. An application running on the server computer or elsewhere may provide the sponsor with access to all or some of the images on the website. The user may be required to grant the authorization for such access as a precondition for being permitted to post or tag photographs on the website. Moreover, the website on which the images are posted may have an ownership interest in the user's images as a precondition for posting the images.

As will be appreciated, a user can be any person who has a set of images, such as photographic images, which can be linked to him personally, e.g., captured with the user's digital camera, mobile phone camera, or the like. An advertising sponsor can be any person or organization targeting the user with personalized advertising content.

The exemplary digital images 16 are photographic images, such as individual photographic images (photos), video images (videos), and combinations thereof which may be multicolor (color) and/or monochrome (black and white) images. The images 16 may be stored in any convenient file format, such as JPEG, TIFF, or the like. In general, each input digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color channel, however expressed (RGB, YCbCr, etc.). Digital images may also have associated information in addition to the image data, which may be in the form of metadata, such as that included in exchangeable image file format (EXIF) data in the case of image files from cameras, smartphones and scanners, or geopositional (GPS) information.

Server computer 10 includes main memory 28 which stores an advertising content module 30 in the form of software instructions for implementing the methods disclosed herein. A processor 32, such as the computer's CPU, is in communication with memory 28 and data memory 34 via a data/control bus 36. Processor 32 executes the instructions 30 and may also control the operation of server computer. A network interface 38 enables the computer 10 to communicate with other devices, e.g., via network 14. Memory 34 may be resident on the server computer 10 or on a linked computing device(s). Client device 12 and remote server 24 may be similarly configured with a respective processor, memory, and a network interface. Client device 12 also includes a display device 40, such as a computer monitor or LCD screen, and one or more user input devices 42, such as a keyboard, keypad, cursor control device, touch screen, or the like, for inputting commands to the client device processor. The client device 12 may be a specific or general purpose computer, such as a PC, such as a desktop, a laptop, tablet, or palmtop computer, a portable digital assistant (PDA), mobile phone, or other computing device having an associated display.

The digital processor 32 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2, can be used as the processor. The memory or memories 28, 34 may represent any type of non-transitory computer readable medium such as random access memory (RAM), read only memory (ROM), magnetic disk or tape, optical disk, flash memory, or holographic memory. In one embodiment, the memory 28, 34 comprises a combination of random access memory and read only memory. Exemplary memory 28, 34 stores instructions for performing the exemplary method and data used and generated therein, as well operating instructions for operating the computer 10.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The images in the user's image collection 26 are relevant for building a user profile 44, as they are primarily used for sharing moments with friends. As a consequence, they tend to reflect the user's interests, such as activities and hobbies, such as mountain climbing, cycling, fishing, places of interest, lifestyle elements, such as urban photographs and social photographs containing many people, and other interests. For example, a user very interested in cycling may have captured quite a large number of images on his camera which include bicycles, cyclists, and related items and may have uploaded some of these to his web page 18 and/or have bookmarked such images on web pages of friends or on a photo access website. Accordingly, the user's image collection may include a higher proportion of cycling-related images than a typical user of the website would have. The user may also be quite interested in skiing and have a few images of that sport in his collection.

The user profile 44, which is representative of the user's image collection 26, is stored temporarily or permanently in memory, such as data memory 34. For example, on a social networking site, photographs 16 uploaded by the user can provide information regarding the user's interests which can be used to generate the user profile. In the exemplary embodiment, profiles 44 may be generated for a plurality of users and stored in computer memory 34. Each user profile 44 may be in the form of a histogram which stores values representative of the distribution of images 16 in the user's collection 26 over a predetermined finite set of visual categories, although other representations of the data forming the profile are also contemplated. In some embodiments, photographs available online that are related to the user, for example, because the user is "tagged", i.e., identified in the photograph, or because the user is associated in some way to the photo (e.g., photographs of an event that the user participated in, may also be used to generate the user profile 44 where they can be automatically and unambiguously linked to the specific user. In one embodiment, the entire user collection is used for generating the profile 44. In other embodiments, a random selection (i.e., less than all) of the user's images may be employed.

Figure 3A:
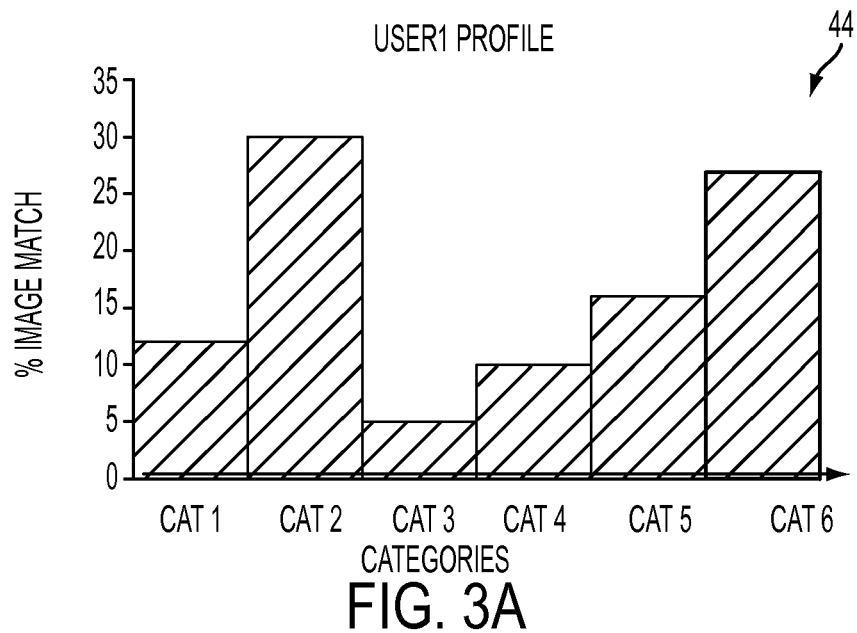
FIG. 3 illustrates two exemplary user profiles.
Figure 3B:
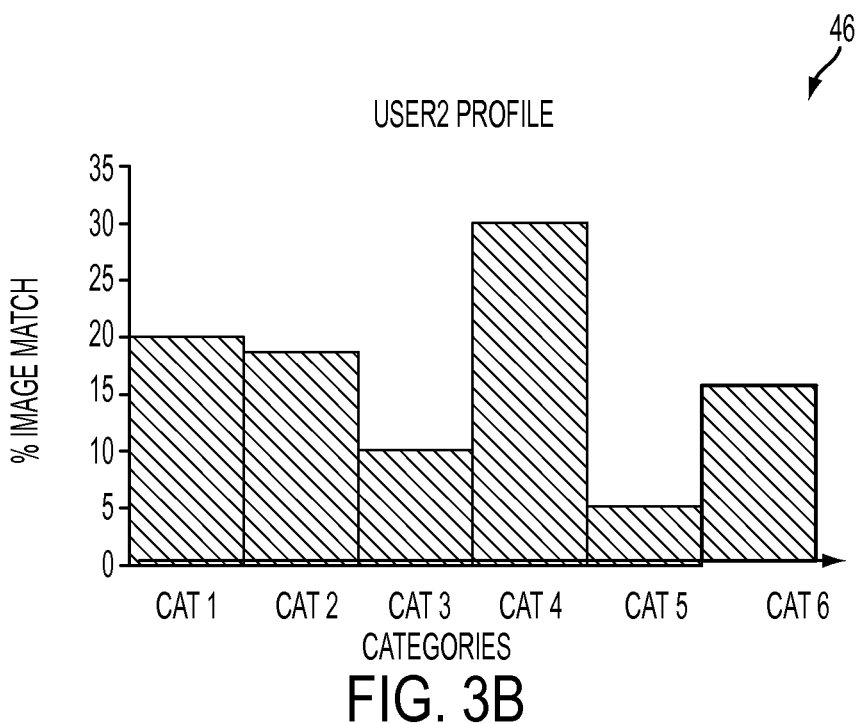

FIG. 3, by way of example, graphically illustrates two user profiles 44, 46 which show the distributions of the respective users' photograph collections 26 over a set of six content-based categories labeled cat 1-cat 6 and a sixth category cat-6 in terms of a measure of images matching each of a plurality of categories (here, the percentage of images matching that category, as output by the categorizer). For example, category 2 may be the cycling category and category 4 may be the skiing category in the above example, and category 6 may be an "other" content category. As will be appreciated, there can be any number of categories, such as from two to one hundred categories or more. The exemplary two users have different profiles, as shown by the percentage image match for each category. Image match (here expressed as a percentage of the images in the user's collection which match the category) will be described further below. User 1, for example, has more images matching category 2 than User 2 and User 2 has more images matching category 4 than does User 1.

Figure 4:
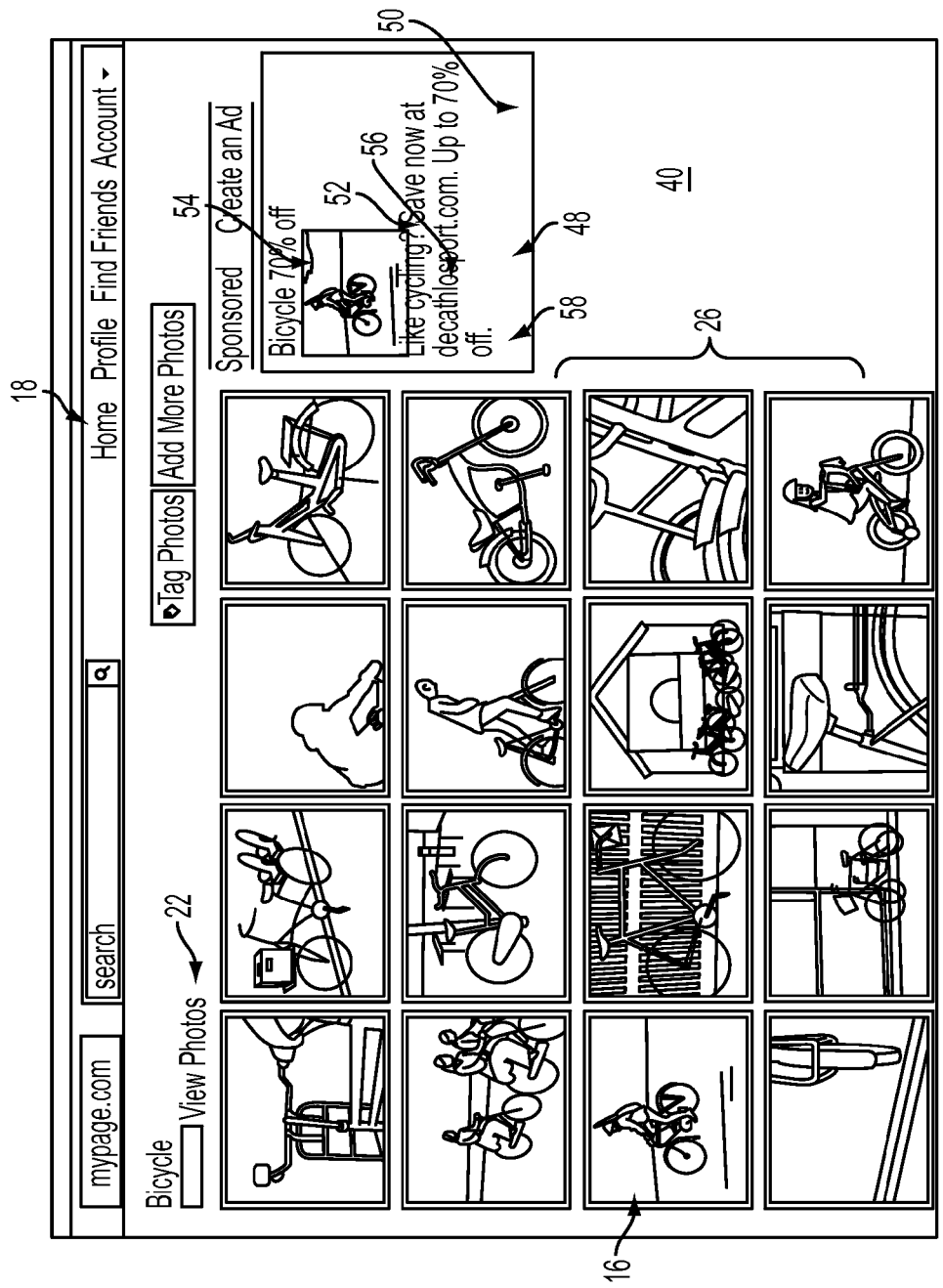
FIG. 4 is a screenshot of an exemplary web with an advertisement generated from a user image.

With reference also to FIG. 4, which shows an exemplary screenshot of the user's webpage 18, an advertisement 48 is displayed to the user on the display screen 40 of the client device 12. The advertisement 48 may is linked to the advertising sponsor's website and which opens a sponsor's web page when the user actuates the link, e.g., clicks an area 50 of the screen 40 associated with the advertisement. The advertisement may be in the form of a popup, banner, sponsored link, or the like which is displayed together with other content of a web page, here shown next to the user's own web page 18. The advertisement may relate to a product, service, event or the like that is sponsored, sold, or offered for sale by the sponsor. As will be appreciated, "advertising sponsor" is used loosely to refer to the sponsor himself or someone working on his behalf, such as an advertising agency or a sponsor's website generator.

Figure 5:
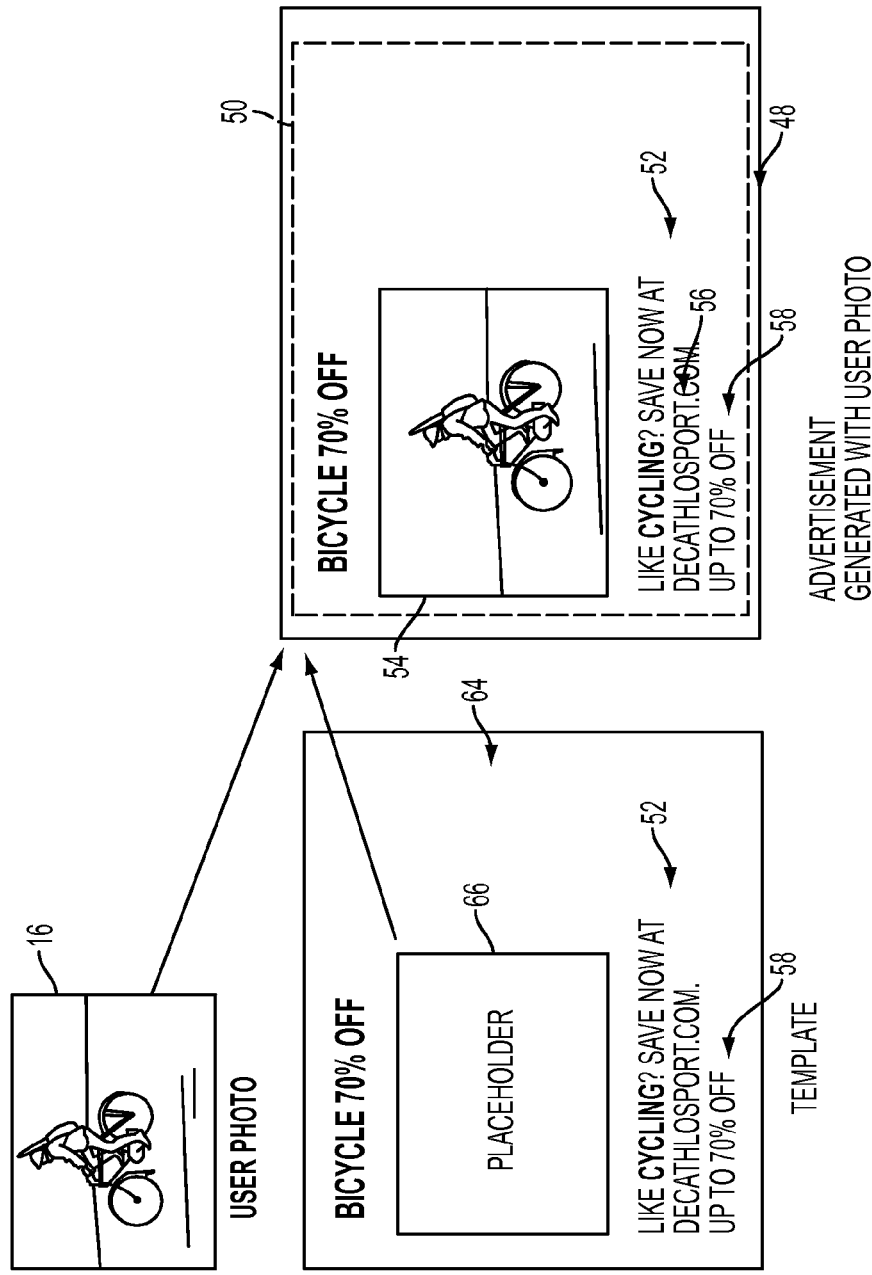
FIG. 5 illustrates insertion of a user image into a placeholder to generate an advertisement.

As illustrated in FIG. 5, the advertisement 48 may include sponsor content 52 together with one or more images 54, which may be relevant to associated sponsor content 52. The sponsor content 52 can be textual, non-textual or both and can be considered as encompassing all of the advertising content except for the image 54. The sponsor content 52 may include a reference 56 to the advertising sponsor, such as a web address, a company name, a logo, trademark or trade dress of the company or its product or service, a combination thereof, or the like (here the sponsor's web address) and/or other textual content 58. In the case of textual content 58, this may include a description of the goods or services being offered by the sponsor (e.g., bicycle), price-related information (e.g., 70% off), sale dates, combination thereof or the like. The sponsor content 52 may partially or completely surround the image 54, partially or completely overlay it, be placed to one side of it, or otherwise arranged in relation to the image 54.

The advertising sponsor may have a collection 59 of images 60, which are stored in memory 34 accessible to the system. These images 60 may be categorized into categories. For example, the sponsor may have at least two (or three, four, or more) images 60 that are each assigned to a respective, different category.

The advertising image 54 is selected based on one or more of the images 16 in the user's image collection in order to attract the user's visual attention to the advertisement 48. The exemplary image 54 is variably selectable, based on the particular user's images. The exemplary advertisement content can make use of, e.g., in the selection of image 54 and/or sponsor content 52, one or more of:

i. the user's images 16;
    ii. a user profile 44 based on such images;
    iii. sponsor's images 60 selected based on i. and/or ii.; and
    iv. combinations thereof, optionally informed by keywords, posts, web links, resumes, or other content.

In one embodiment, the advertising image 54 is derived from one or more of the user's images 16. For the purpose of the exemplary embodiments, when an advertising image 54 is derived from a user's image, this means that image 54 can include an entire user image 16, a thumbnail image (i.e., a reduced pixel resolution image) derived from pixels of the user's image 16, a crop (e.g., selected part(s)) of the user's image 16, an enhanced or otherwise modified image generated from the user's image 16, e.g., a colorized image, an image in which artifacts are removed, such as red-eyes or unwanted people, an image in which has been straightened, sharpened, color balanced, color histogram modified, tinted, or soft focused image, or a user's image to which text or a logo has been added, combinations thereof, and the like. In general, when image 54 is derived from a user's image 16, it is visually recognizable by the user as being derived from the user's image 16 to attract the user's attention to the advertisement 48.

In another embodiment, the image 54 may be selected from the sponsor's collection 59 of images 60 stored in an image database 62 (FIG. 1), and thus is not (generally) among the user's images 16.

In one embodiment, image(s) 54 is/are selected for the advertisement 48 based on the user profile 44, 46. For example, if the profile 44 suggests that User 1 is more interested in cycling than skiing, for example, and the sponsor has a web page related to cycling, the selected image 54 for advertisement 48 displayed to User 1 may be a cycling-related image. In this embodiment, the image 54 may be selected from the user's images 16 or the sponsor's collection of images 60.

In another embodiment, the image 54 is selected based on a comparison measure, such as similarity or distance. In this embodiment, the image 54 may be a sponsor's image 60, which is selected based on its similarity to one or more of the user's image(s) 16. Or, the image 54 may be a user's image 16 which is selected based on its similarity to one or more of the sponsor's images 60.

Combinations of these image selection methods are contemplated. In one embodiment, for example, the advertising image 54 is derived from one or more of the user's images 16 and may be selected, at least in part, based on the respective user's profile 44, 46 and its similarity to one of the images in the sponsor's collection 59. In another embodiment, the advertising image 54 is a sponsor's image 60 and may be selected, at least in part, based on the respective user's profile 44, 46 and its similarity to one of the user's images 16.

Additionally, one or more other factors may be taken into consideration in selecting the advertising image 54, e.g., one or more of textual information, such as the visible text 58 of the advertisement, metadata associated with the advertisement, keywords associated with the user's images, e.g., as metadata, GPS information associated with the user's images, and other media information.

FIG. 5 graphically illustrates one exemplary method of dynamically creating the advertisement 48. A template 64 is provided in memory 34, which includes sponsor content 52, such as text, logo, other images, combinations thereof, or the like, and a placeholder 66 sized to receive an image 54. A user image 16 is selected and image 54 derived therefrom is inserted into the placeholder 66 to generate the advertisement 48. The advertisement 48 thus generated includes at least user-actuatable link 50 to the sponsors website, which a user can click on or otherwise actuate. The link 50 generally corresponds to at least a portion of an area of the screen occupied by the advertisement. While the sponsor content 52 in the illustrated template 64 is fixed, in other embodiments, it may comprise variable data.

Figure 6:
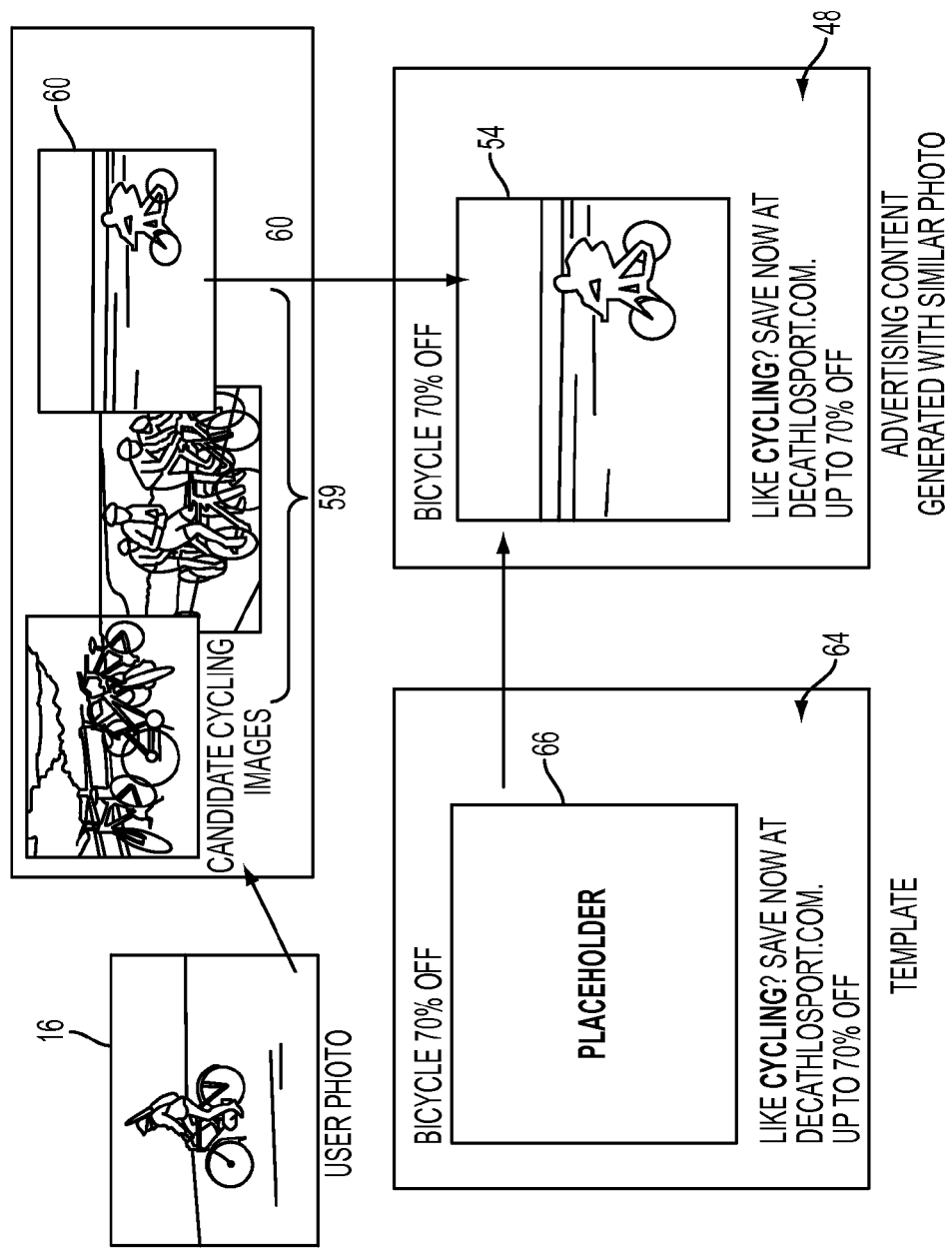
FIG. 6 illustrates selection of a sponsor's images from a set of candidate images based on a user image.

FIG. 6 graphically illustrates another method for generating the advertisement 48. In this embodiment, one of a set of candidate images from the sponsor's collection 59 is selected based on its similarity to a user's image 16 and/or the user's profile 44 and is inserted into the template's placeholder 66 to generate the advertisement 48.

Figure 7:
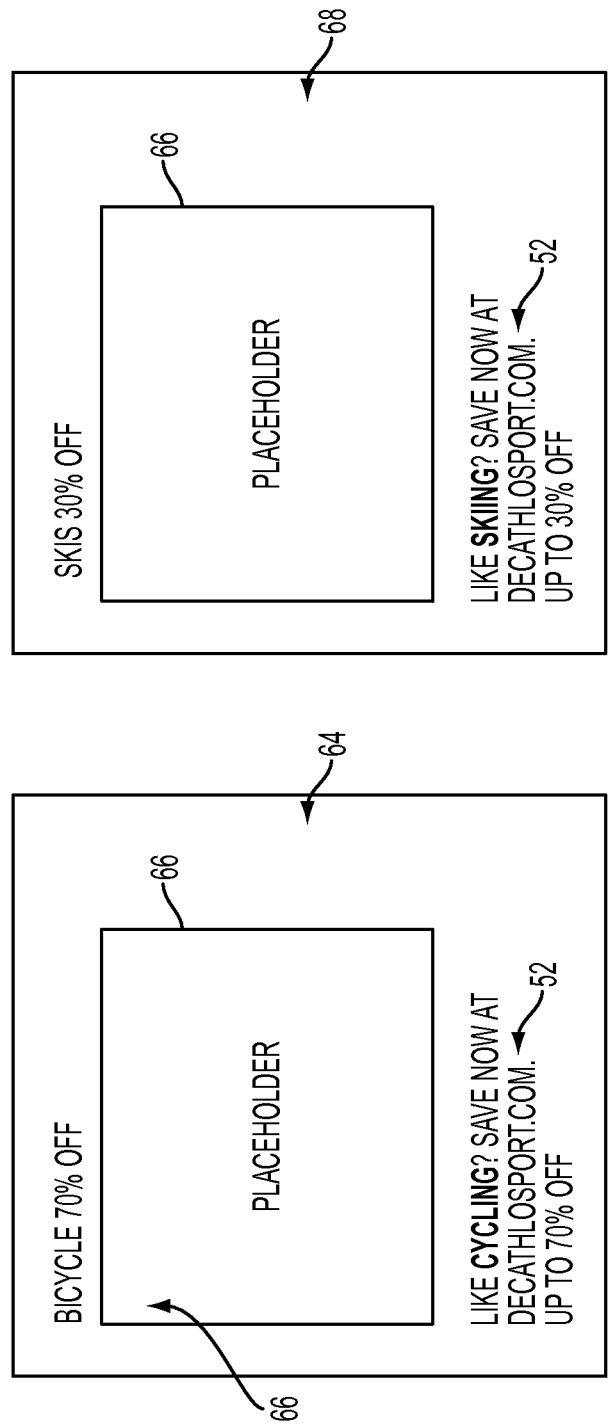
FIG. 7 illustrates personalization of templates based on user images and/or profiles.

In some embodiments, two or more templates 64, 68 are provided, as illustrated in FIG. 7. Each has a placeholder 66 sized for receiving an image 54 but each has different sponsor content 52. One of the templates 64, 68 may be selected automatically for the advertisement 48, based on the user's images, e.g., based on the similarity of the textual content 58 to the user's profile 44, 46. For example, if the user's profile is like that of User 1 in FIG. 3, the first template 64 may be selected to reflect the user's interest in cycling, whereas if the user's profile is like that of User 2, the second template 68 may be selected, to reflect the user's interest in skiing. An image selected from a corresponding category of images is inserted in the placeholder 66. Thus, for example, a sponsor's or user's image 54 in the cycling category can be used for insertion into template 64 and an image 54 in the skiing category can be used for template 68. Advertisements 48 formed from both templates 64, 68 can take the user to the same sponsor's website when clicked on. However, they may each take the user to a respective specialized webpage of the website which focuses on the relevant category of goods or services (e.g., bicycles and related items or skis and related items). In general only one advertisement from the same sponsor is shown at any one time. If, based on his profile 44, a user has two or more interests which are compatible with the sponsor's goods or services, the sponsor may cycle between the different templates 64, 68 for the same user, e.g., on the same or different days, e.g., if the user does not click on the first advertisement 48 that is shown to the user on his webpage 18. In other embodiments, a template 64 having variable data 52 may be used in place of two templates 64, 68.

In the exemplary embodiment, image classification and comparison measures are used to match images available from a user, a user profile based purely on image content available from the user's page or closely linked pages, or a combination of these and text/other media information with the sponsor's content.

As illustrated in FIG. 1, the advertisement module 30 includes a signature generator 70 which generates a signature 72 of an image 16, 60 and an image categorizer 74 configured for assigning an image 16, 60 to one or more of a set of categories, based on its signature 72.

The exemplary image signatures 72 can be histograms, Fisher Vectors, or the like, or any suitable representation of the image which allows a comparison computation to be made.

A similar classifier can be used to categorize textual content of the user's webpage 18, based on a histogram of the frequencies of words, occurrence of specific keywords, or the like.

A comparison computation component 76 (FIG. 1) may be provided for computing a comparison measure between one or more of user's images 16 and one or more of sponsor's images 55 in database 56. The term "comparison measure" or similar phraseology is used herein to encompass a similarity or distance measure. The comparison measure between two images may thus be computed based on a distance (or similarity) between the two images based on their content. As with the categorization, an image signature 72, such as a vector, of each image being compared may be used to represent the image content and a comparison measure, such as the distance between them may be used. A suitable distance measure is the Euclidean distance between the two signatures. A chi$^2$ distance, Manhattan distance, or other suitable distance metric can alternatively be used.

A profile generator 78 is used to generate the user profiles 44, 46. The profile generator takes as input the categorization information for some or all of the user's images 16 and generates a respective user profile 44, 46 for each user. In some embodiments, the user profiles can be generated, in part, from information given by textual content of a user web page 18 and/or other types of visual content (company logos, images from related links, bookmarks, tagged, 'friends' images, font schemes, etc. and thus is not exclusively limited to the user's photographs.

A template selector 80 selects an appropriate template 64, 68 from a set of such templates, where more than one template is available. The template may be selected based on one or more of the user image(s) 16, user profile 44, and selected image 54. A combining component 82 combines the selected image with the template to form the advertising content 48.

In combination, the components 70, 74, 76, 78, 80, 82 of the advertising content module 30 allow advertising content 48 to be created dynamically and individually for each user, based on their user images 16. As will be appreciated, components 70, 74, 76, 78, 80 may be separate or combined and fewer more, or different components may be employed. The exemplary components 70, 74, 76, 78, 80 are all in the form of software instructions which are stored in computer memory 28 of computer 10 or in memory accessible thereto.

As will be appreciated, although the various components 70, 74, 76, 78, 80, 82 are described as separate modules, one or more of these may be separated into additional modules or combined. Some of the processing components may work on the input of a prior module. In some cases, text may be returned to a prior module for further processing.

Figure 2:
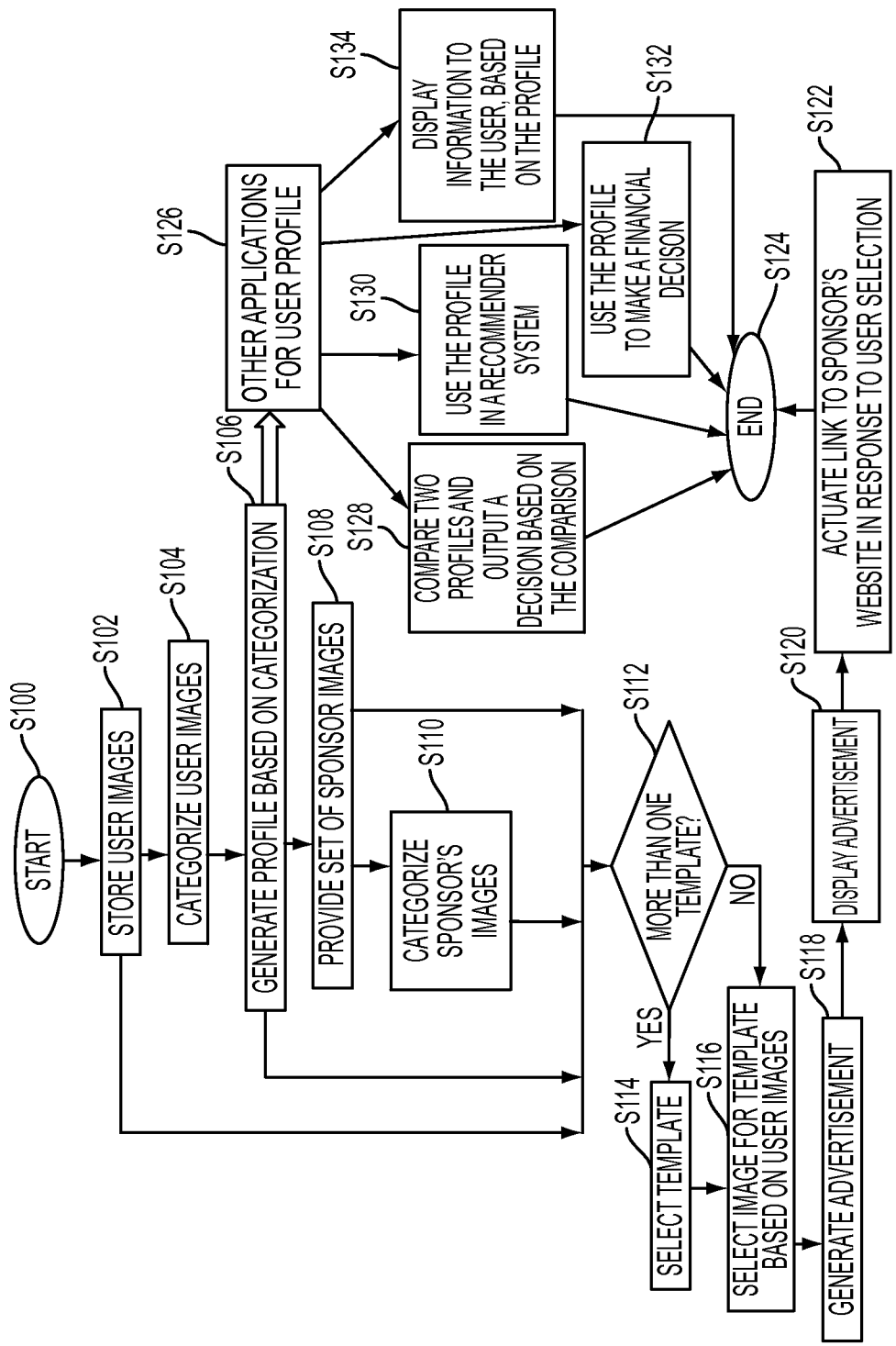
FIG. 2 is a flow diagram illustrating a method for generating advertising content based on user images.

FIG. 2 illustrates a computer implemented method for generation of the advertisement which may be performed with the system illustrated in FIG. 1. The method begins at S100.

At S102, a set of user images 16, e.g., from the user's web page 18, is temporarily stored in memory 34.

At S104, user images 16 are categorized, which may include generating a signature 72 (with signature generator 70) for each of the user images 16 based on extracted visual features of the respective user image and categorizing the image (with categorizer 74) based on the signature 72.

At S106, a user profile 44, 46 is generated, based on the categorization information output at S104.

At S108, a set of sponsor images 55 is provided and stored in memory 34. The set may include one or more images.

At S110, the sponsor's images 55 may be categorized which may include generating a signature 72 (with signature generator 70) for each of the sponsor's images 55, based on extracted visual features of the respective image 55 and categorizing the image (with categorizer 74). The sponsor's images may each be tagged with an appropriate category label (with categorizer 74).

At S112, if there is more than one template, at S114, a template 64 is selected for advertisement 48. The template may be selected from a set of templates 64, 68, e.g., based on the user profile 44 generated for the webpage on which the advertisement 48 is to be displayed.

At S116, an image 54 is selected for the template 64, based on the user's images 16.

At S118, advertisement 48 is generated, which includes combining the template 64 and image 54.

At S120, the content 48 is displayed to the user on a viewed webpage, e.g., as a popup, banner, suggested link, or the like. The advertisement thus appears on the user's screen 40, e.g., at the same time as the user's webpage is being displayed.

At S124, the user may elect to click on, or otherwise actively select, the advertisement 48, which actuates a link 67 to the sponsor's website and displays a sponsor's webpage to the user.

The method ends at S126.

In some embodiments, a user profile generated at S114 is used for other purposes. For example, at S126, a first user profile for a first user may be compared with a second user profile generated in the same manner for a second user. Based on the comparison (for example if the similarity between the two profiles exceeds a threshold comparison measure), the first user may be provided with a recommendation based on information acquired from the second user.

The method illustrated in FIG. 2 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

Various aspects of the system and method will now be described.

Image Acquisition

A set of images 16 for the user may be accessed or acquired from the user's individual web page (e.g., from the web page itself or from the repository 22 which stores the images displayed on the web page), from friends' web pages on which the user has tagged the images, the user's computer, or a combination of sources.

Image Signature/Categorization

In some aspects of the exemplary method, a signature 72 of an image 16, 60 is extracted by the signature generator 70, based on low level features of the image. The signature 72 allows an image to be categorized into one of or more of a set of predefined categories (S104, S110) and/or can be used for computing distances between images (S116). The categories may be selected to match the sponsor's product/service categories. Alternatively, a generic set of categories may be employed.

Various methods for generating an image signature 72 and for categorizing the image based thereon are known. The exemplary image signature and categorization is based solely on the image content, i.e., the pixels of the image, and not on any user-applied tags, GPS tags, or other metadata associated with the images. In general, features are extracted from patches of the image and used to build a multi-dimensional vector that is representative of the image.

For example, any of the methods disclosed in the following references can be used for generating an image signature 72 based on content: U.S. Pub. Nos. 20070005356, 20070258648, 20080069456, 20090144033, 20100092084, 20100098343, 20100189354, and 20100226564; Gabriela Csurka, et al., "Visual Categorization with Bags of Key-points," *ECCV Workshop on Statistical Learning in Computer Vision*, 2004; Florent Perronnin, et al., "Fisher kernels on visual vocabularies for image categorization," in CVPR, 2007; Florent Perronnin, et al., "Large-scale image categorization with explicit data embedding," in CVPR 2010; and Florent Perronnin, et al., "Large-scale image retrieval with compressed fisher vectors," in CVPR 2010; and Perronnin, F., Dance, C., Csurka, G., and Bressan, M., "Adapted Vocabularies for Generic Visual Categorization," in *European Conf. on Computer Vision*, (2006). These references provide methods for describing an image with an image signature (or "representation") based on extracted features. The references also describe methods for computing a score between two images, based on the respective signatures.

Fisher vectors, Fisher Kernel representations, and Bag-of-Visual-Word representations are exemplary of types of high level signature which can be used herein as signatures 72.

For example, the signature generator 70 includes a patch extractor, which extracts and analyzes content related features of patches of the image 16, 60 such as shape, texture, color, or the like. The patches can be obtained by image segmentation, by applying specific interest point detectors, by considering a regular grid, or simply by random sampling of image patches. The extracted low level features (such as vectors) from each patch can be concatenated and optionally reduced in dimensionality, to form a features vector which serves as the image signature. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given a new image 16, 60 to be assigned a signature 72, each extracted feature vector is assigned to its closest visual word in the previously trained vocabulary or to all visual words in a probabilistic manner in the case of a stochastic model. A histogram is computed by accumulating the occurrences of each visual word.

The exemplary categorizer 74 may include one or more classifiers, such as a set of binary classifiers, which has/have been trained on a training set of manually labeled images and their corresponding signatures 72. The trained classifier(s) assign a user image or sponsor image into one of the categories (such as the categories 1-5 illustrated in FIG. 2), based on the computed image signature 72. For images, a Fisher vector or "bag-of-visual-words" vector can be used as a suitable signature 72. The classifier receives the vector signature 72 of the image and outputs a classification based on the vector signature. The classification may be hard (e.g., "1" if the object is assigned to the class or "0" otherwise), or can be soft (e.g., the classification output is a value between 0 and 1 inclusive with higher values indicating a higher likelihood of membership in the class). A soft classification can be converted to a hard classification by thresholding. Typically, the categorizer has adjustable parameters whose values are determined by training respective to a labeled training set. The objective of the training is to select the adjustable parameters such that the output of the classifiers substantially agrees with the classification labels assigned to the objects of the training set.

The exemplary classifier(s) may be linear or nonlinear, and use any suitable classification training algorithm, such as sparse logistic regression, naïve Bayes, linear discriminant analysis, support vector machines, linear regression, or any other suitable machine learning method. Each classifier model can be trained with a large training set of manually labeled images and their respective image signatures 72. Each model may be trained with both positive examples (training images labeled with that category) and negative samples (training images not labeled with that category). The trained classifier models are able to assign a score based on how well an image signature 74 matches the model.

In the exemplary embodiment, a Generic Visual Classifier (GVC), as described, for example, in above-mentioned U.S. Pat. No. 7,680,341, is used for the categorizer 74.

Profile Generation (S106)

The exemplary user profile 44 is generated from a set of categorized user images 16, such as at least 20 or at least 50 user images. The user profile can be described as a histogram showing the distribution of images per category.

In one embodiment, for each image 16 in the set of user images, the profile generator 78 receives a score from the categorizer 74 for each category in the set of categories, e.g., on a scale of 0-1. In other embodiments, each image is assigned by the categorizer to the most probable category, e.g. a score of 1 for the most probable category and all the others are assigned a 0 score. Other methods of assigning scores are contemplated. The profile generator 78 may sum the scores for all images 16 for each category. The category scores can then be normalized, for example, so that the category scores sum to 100%. This provides a profile 44 having a percentage image match score for each of a set of categories. For example, in the profiles illustrated in FIG. 2, the % image match for each category is obtained by dividing the number of images with this category tag by the total number of category tags attached to this user's pictures.

In other embodiments, the scores of n categories may be converted to a ranking, with the highest score being assigned a 1, and the other scores numbered sequentially in order of decreasing score from 2 to n.

In some embodiments, the system may consider only the top ranked or a few of the top ranked categories as representative of the user's profile. For example, the system can use the highest ranked categories (the ones that have been triggered the most often) to create a profile of the user. In other embodiments, the system may generate a user profile based on specific categories (e.g., as an indicator of what sports the user likes) to trigger specific actions.

Image Selection (S116)

By way of example, several different methods of selecting images/advertisements for display to users will now be discussed.

1. Use of Sponsor Images Based on Direct Comparison Measure

Assuming the advertiser has a set 59 of professional images 60 available for display, in one embodiment, an image similarity measure may be computed to find an image 60 from this set which matches most closely an image from the user's photographs 16. The expectation is that by displaying an advertising image 54, which closely matches one a user has taken, there will be a higher chance of the user clicking on it.

In this embodiment, a comparison measure is computed between the signatures 72 of some or all of the sponsor's images 60 and corresponding signatures 72 of some or all of the user's images 16. For example, signatures for a set of fewer than all user images, such as those which have been tagged with a specific category by the categorizer 74, are compared with signatures of the sponsor's images 60 in the same category (or all categories). The pair (sponsor image, user image) with the highest similarity/shortest distance may be selected and the sponsor's image 60 in that pair is used as the advertising image 54 and may be placed in the placeholder 66.

2. Use of Sponsor Images Based on User Profile

In this embodiment, similar to the method above, the method may automatically or manually choose a sponsor's image 60 based on the user's profile 44, 46. For example, each of the sponsor's images 60 may be tagged by the categorizer 74, with a respective image 60 being ranked/scored based on whether the category assigned by the categorizer is a high scoring category in the user's profile 44. The user's profile 44 may include other information associated with the photographs, such as textual labels and geopositional (GPS) data and additional features may be computed based on these. The selection of the sponsor's image 60 may thus be based on these features as well as on the category matching. This allows the most appropriate image to be shown based on an overall profile, again increasing the chance of the user clicking and generating traffic to the target site or product. For example, if the user's geo-position tags, or other metadata associated with the images suggest that the user is located in France, then an advertisement directed to French users may be selected, or no advertisement may be displayed, if the products are only sold in the US, for example.

In another embodiment, a predominant category is identified in the user profile. The predominant category can be the category with the highest percentage match score (optionally, after filtering out (i.e., ignoring) percentage match scores of any categories that are determined to be non-relevant, such as an "other" category). Or, it can be one of a set of two or more predominant categories with higher match scores than others of the categories. A distance is computed between each of the signatures of user images 16 assigned to this predominant category and each of the signatures of the sponsor's images 60, to identify a sponsor's image with the shortest distance.

3. Use of User's Images Based on Direct Comparison Measure

In this embodiment, the image similarity metric described in 1) above can be used to select one of the user's photographs 16, which is placed in the placeholder.

For example, signatures 72 of user images 16 and sponsor images 60 are computed and a similar user image is identified based on the computed distance. In some embodiments, the user's image(s) are selected based on the user's profile. In this embodiment, a user profile 44 may be computed and a predominant category identified. Distances are computed between the signatures of the user images in the predominant category and the sponsor images. A user image is selected with a shortest distance computation. In some embodiments, the sponsor's images may be categorized (S110), and the distance computation may be limited to images in matching categories.

As will be appreciated, there may be protocol for determining whether to use a sponsor's image for the advertisement, as in 1) and 2), or a user's image, as in 3). For example, one protocol may specify that a user's image is only selected only when the user's profile is computed to be too far from the sponsor's images.

In one embodiment, a sequence of the user's photographs is generated for the advertisement. In another embodiment, the selected user image(s) may be overlaid with sponsor's content, or the sponsor's content may be placed adjacent to the image, such as one or more of above, below, and on the side of the image.

Combining Template with Selected Image (S116)

Any suitable method for combining the template 64 with the selected image 16 or 60 is contemplated. When the template comprises a logo, for example, it may be overlaid on the user's image, i.e., obscuring at least part of the user's image. In other cases, the user's image 16 may be cropped, enlarged, or otherwise modified to fit with the template. In the case of a sponsor's image 60, it may be used without alteration, or may be cropped, enlarged, or otherwise modified based on the user profile or template selected. In general, in the combination, the selected image 16 or 60 may be at least partially overlapping the area occupied by the template 64 or vice versa.

Display of the Advertisement

The advertisement 48 generated from the selected template 64 and advertizing image(s) 54 and an actuatable user link 50 is displayed to the user on the user's screen for sufficient time for it to be viewed by the user. If the user clicks on the link 50, taking the user to the sponsor's webpage, the user's profile 44 may be compared with profiles 46 of other users to identify users with similar profiles to which the same advertisement 48 may be displayed.

The exemplary method can be used alone or in combination with existing techniques for targeted advertising based on keyword selection from users to improve traffic by:

1. Using images to profile a user (providing a full profile in itself or being combined with textual/other information); and/or 2. Using classification and/or an image similarity measure to select the image, or overlay/web link which is specifically targeted according to the product and/or the user.

Example Applications

As an example, consider advertising from a large sporting goods chain. The professional image collection 59 of this sponsor may contain images 60 of different sports (e.g., cycling, climbing, tennis, etc.) to match various ones of its product lines. In one embodiment, if the user has many photos 16 classified as "cycling," then the sponsor's cycling image may be chosen from the sponsor's collection. In another embodiment, if the user's profile contains images in both "cycling" and "mountain categories," for example, then a cycling image may be chosen from the sponsor's collection 59, and, where there is more than one cycling image, a cycling/mountain image may be chosen over a cycling/urban image. In another embodiment, a user's photos which are classified as 'sport' and/or another category determined to be closest to the professional images may be chosen.

The choice of image 54 may depend on the degree of access to the user's images. In the case where the advertising sponsor does not have access to private elements of the user's webpage, such as photographs, the sponsor may use its own images 60. For example, the sponsor may be provided only with access to the user's profile 44 and may use that to select a sponsor image. The sponsor may thus have less access to images than in a social site where the advertiser has full access or, for example is part of a service for which the user has signed up for. Typically, these services can access more user data, and thus a user's image 16 can be chosen from a matching category.

A social networking application may also use the exemplary method to generate traffic to its own site. For example, if a user's profile 44 contains many pictures of mountains, then an advertisement may display one of these pictures 16 and a text overlay 58 containing a message such as "Your mountain pictures indicate you may be interested in this service," with a link to the service. If such user images are not available to advertisers, a post/advertisement could be displayed on the page of a user's friend who has signed up to the service already.

In the example shown in FIG. 4, a large sporting goods chain sells bicycles as well as other sporting goods, such as skis. The advertisement shows a bicycle rather than a ski photo since the user profile 40 shows that the user has many bicycle images and relatively fewer, or no ski images. In this example, a bicycle photo 16 from the user's picture collection 26 is used, when this is possible. This will have a greater impact on the viewer of the advertisement. The original photo used for the advertisement does not need to appear on the page where the advert is displayed as it is in the screenshot in FIG. 4.

Figure 8:
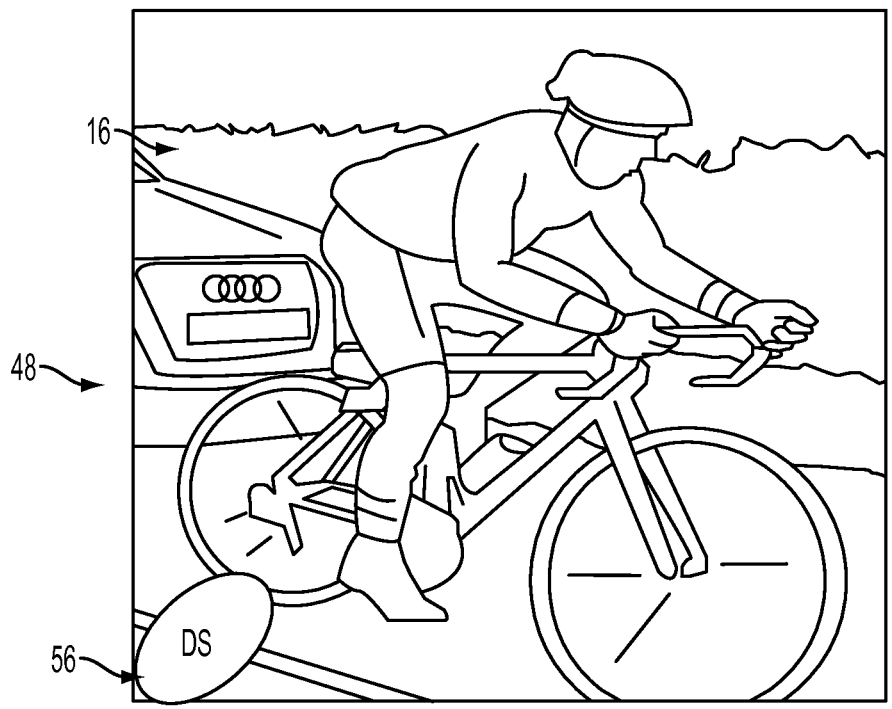
FIG. 8 illustrates an exemplary advertisement which includes a user's image and a sponsor's logo.

As illustrated in FIG. 8, the advertisement content 52 may include a reference 56 to the sponsor itself or the product or services offered by the sponsor, such as a logo. Here the initials DS is intended to be a recognizable company trademark which the user may be expected to recognize, such as a logo of the sporting goods store (based on his interest in sports), although the logo could be that of a cycle manufacturer whose goods are sold by the advertising sponsor or other related icon. The logo 56 may be overlaid over the user's image 16. The icon 56 can be relatively small in relation to the size of the user's image 16, so that the user is first attracted by the image 16 and then notices the logo. The icon 56 may be positioned at one corner of the image 16. Since the icon is related to the subject of the image, the user is more likely to click on the icon 56 or other related user-actuatable link 67 to the sponsor's website.

As other examples, if user photos are tagged using an image classifier as 'mountain,' then the icon could be the trademark of a well-known ski or mountaineering goods manufacturer. Similarly, for images of cars of a particular type, a link to the manufacturer could be presented using the car company logo.

As another example, on a web page where users can sign up for a service, a symbol 56 representing the service may appear on the user's image(s), thereby providing a shortcut to the service. Additionally, when a user's image with the overlaid symbol propagates to other users who do not know of the service, they may be intrigued by the symbol and click on it to discover more. Depending on the social networking site such overlays on photos may be allowed and thus a user who is viewing a friend's page may see icons on images in or adjacent his friend's web page that are generated based on his friends or his own image collection.

In the case of logos or other icons 56, the method may proceed as follows. Signatures 72 of user images and sponsor images are computed. A user profile 44 is computed (S106) and a predominant category of user images identified from the profile. Sponsor images 60 may also be categorized, for example, using the same image categorizer 74 trained with generic or targeted categories (S110) or may be manually categorized. Advertisement content (logo, template, or the like) satisfying the predominant category of user images is selected (S114) to augment a selected image 16 or 60 from the predominant category of user image. The set of logos 56 may be categorized so that a logo in the user's predominant category is selected for the image.

While particular reference is made herein to social networking and image content in the form of user photographs, the method may also be applied to other network sites, such as professional networks, job seeking sites, dating sites, etc., and other types of image content, such as fonts, colors, video, presentations, and other media, which can be placed within a classification framework and used in a similar fashion. For example, a color palette comprising a plurality of colors may be extracted from one or a set of user images in a predominant category of the user profile and advertising content selected to match the color palette. See for example, U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al., and U.S. patent application Ser. No. 12/890,049, filed on Sep. 24, 2010, entitled SYSTEM AND METHOD FOR IMAGE COLOR TRANSFER BASED ON TARGET CONCEPTS, by Sandra Skaff, et al., for methods of extracting color palettes.

Profile Matching

In one embodiment, two user profiles may be compared and a decision may be output based on the comparison (FIG. 2, S128). To compare two users, a comparison measure may be computed between their profiles. For example, for User 1 and User 2, a comparison measure can be computed between the two user profiles 44, 46 (FIG. 3) (e.g., by computing a distance between the two histograms). As an example, the following formula may be used to compute the distance as a matching score:

$$\text{Matching Score} = \frac{200 - \sum_{i=1}^{N} |P1i - P2i|}{2}$$

where N is the number of categories (six in the example); P1$i$ is the percentage image match of category i for User 1; P2$i$ is the percentage image match of category i for User 2.

In the above example, the percentage image match values range between 0 and 100 and sum to 100. In the case where the score ranges between 0 and X, 200 in the above equation can be replaced with 2x.

In the exemplary embodiment, a matching score of 100 means that the two users have exactly the same distribution of categories in their images and a matching score of 0 means that, for each category, if one user has pictures classified in this category, the other user has no picture in this category.

Thus, for example, in the case of the two profiles in FIG. 3, the matching score:

$$= \frac{200 - (|12 - 20| + |30 - 18| + |5 - 10| + |10 - 30| + |17 - 6| + |26 - 16|)}{2} = \frac{200 - 66}{2} = 67$$

is computed.

A threshold comparison measure may be established. For example a matching score of 50 may be established in the above example such that matching scores at or above this level are considered to indicate similar profiles. A score of 67 may thus trigger a further computer implemented step, as exemplified below.

Given a profile for User1 and a set of other user profiles, the best matching profile for User1 can be detected by finding the one that maximizes the matching score.

Figure 9:
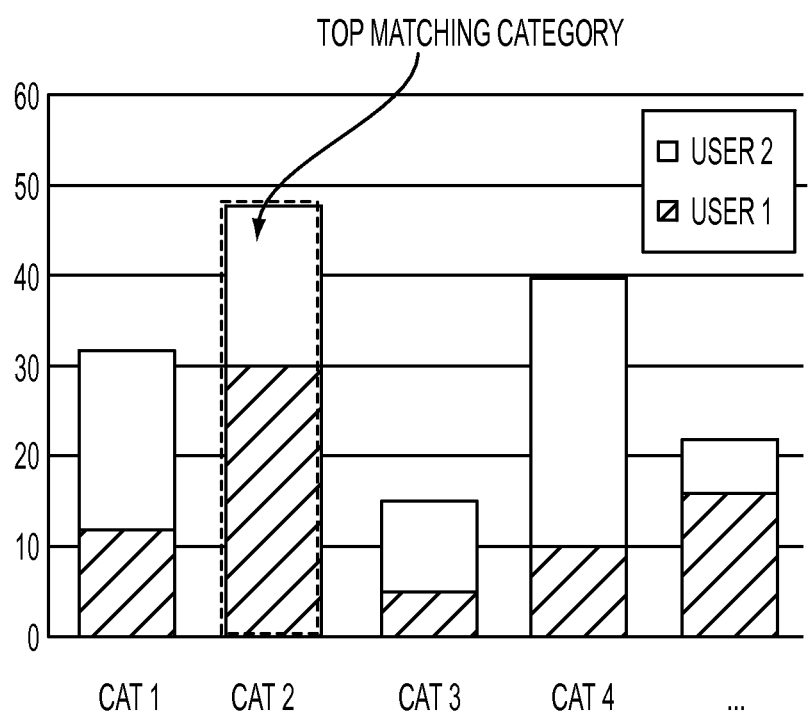
FIG. 9 graphically illustrates a comparison of two user profiles.

In some embodiments, it may be useful to detect the top category that any two users have in common. This is computed by maximizing (P1$i$+P2$i$) with the definitions above. This can also be visualized in FIG. 9, where category scores for the two users are stacked. The category that corresponds to the tallest bar is the top category. This is not restricted to one category only, for example the three top matching categories could be extracted by selecting the three tallest bars.

The exemplary profile comparison method thus takes into account the distributions of images over the set of categories. As will be appreciated, other methods for computing a distance between histograms are also contemplated for comparing two user profiles 44, 46, such as the Earth Mover's distance, Euclidean distance, $chi^2$ distance, Manhattan distance, or other suitable distance metric.

Profile Applications

The exemplary system 1 and method for generating a profile 44, 46 for an individual can find application in other contexts, such as for recommender systems (for making suggestions for tourism, music, dating sites, entertainment, and the like) (FIG. 2, S130), and for making financial decisions by insurance or credit companies that would benefit from knowing more about the customer requesting a new contract or credit (FIG. 2, S132). As will be appreciated the system may include some or all of the components shown in FIG. 1, optionally with additional components.

Currently, most of the profiling information is based either on user submitted data (textual or based on forms), or on numerical values computed from user activity (visited web sites, past purchases, and the like).

In the exemplary embodiment, a user profile 44, 46 based on user images can provide additional or alternative information to that given by exiting profiling systems.

The user's profile may also be used to validate information that the user has provided himself. For example, if the user's profile is not consistent with information provided by the user, this information may be used to contradict, flag, or draw an inference from the information he has provided. If User 1 answers "no," for example, to a prompt which asks if he is interested in cycling and his profile suggests that he is, the user's answer may be flagged as potentially incorrect or an entire set of responses may be flagged as potentially inaccurate.

In one embodiment, a recommender system compares the use profile to one or a set of other user profiles and makes a recommendation to the user based on the comparison. For example, if User 1 has a profile similar to User 2, then sponsored links for websites which User 2 has frequented may be displayed to User 1. Or, on a social network site, User 2 may be recommended to User 1 as a friend with similar interests. Or, a user group may be proposed to User 1. For example, on a photo sharing website, a group that similar User 2 has joined may be proposed. In one embodiment, User 1's profile is compared to the profiles of all the members of the group (or to an average or representative profile for the group), and if a threshold average matching score is found, the group is recommended to User 1.

1. Outputting Information Based on User Profile (S134)

An implementation of the use of user profiles 44 has been demonstrated through a social networking site. The user first connects with her account on the site, and grants access to her images 16 posted on the site to the profiling application of the system 1. Then, the system sorts all the user's images 16 according to a set of predefined categories using the image categorizer (GVC) 74. The exemplary GVC categorizer 74 has been trained on a large number of different categories (over 30) including:

Aerial: photos taken from a high viewpoint, e.g. aircraft/mountain/rooftop

Baby: photos of a young child or newborn

Black & white: black & white images (or sepia)

Boats: photos containing boats: sailing or motor

Cars: photos containing cars

Graphic: cartoons/drawings/comics/screen-shots etc, non-photo images

Coastal: can be beach or near the coast line

Cycling: either the activity of cycling or bikes in the photo

Flower

People: photos showing groups of people

Mountains: mountain type landscape

Sunset: either a sunset or sunrise image

Urban: urban setting, streets, in-town images, buildings, roads, bridges, etc.

Figure 10:
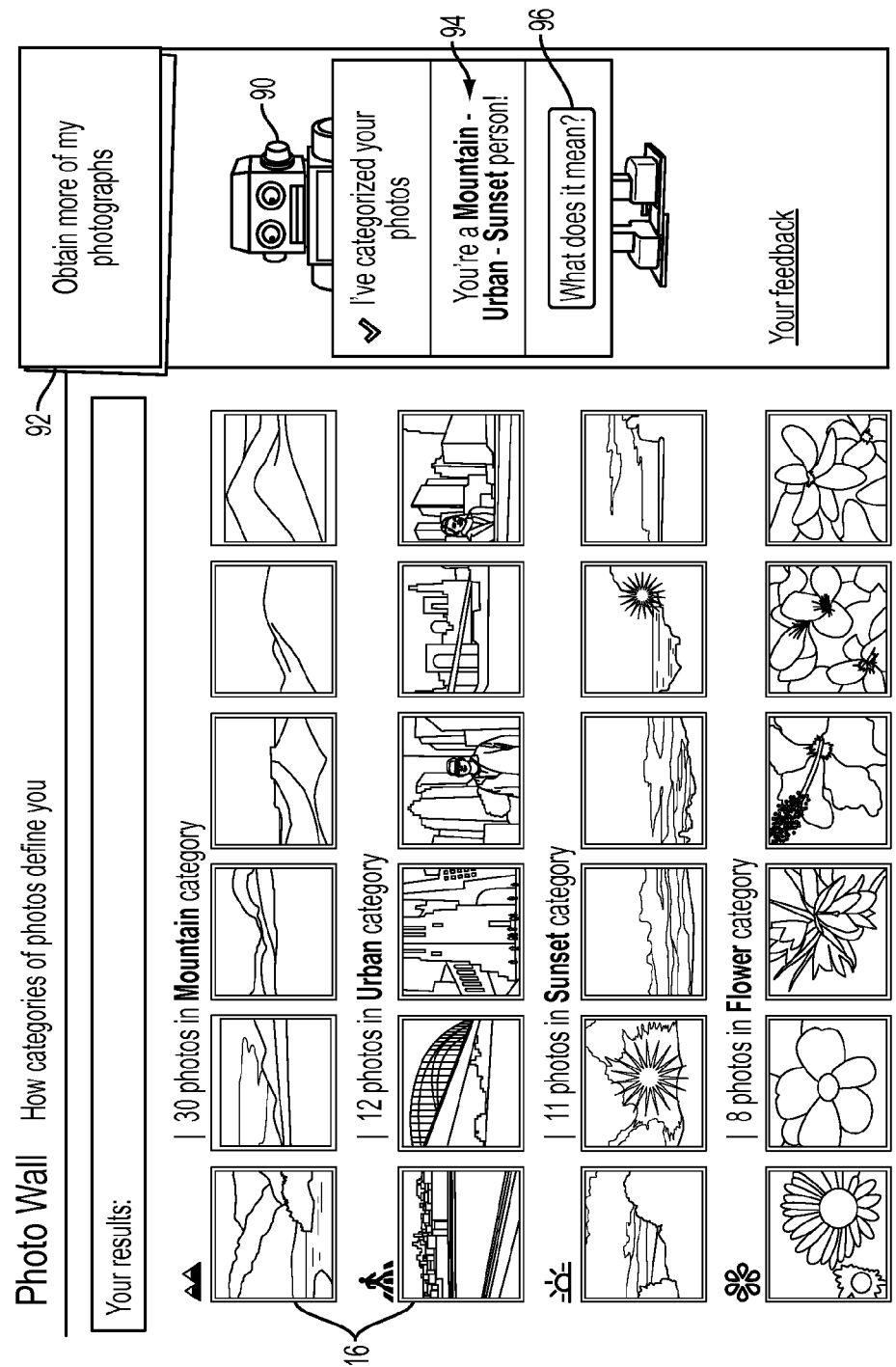
FIG. 10 illustrates images on a user's web page ordered by category and an interactive method for profiling the user.

As illustrated in FIG. 10, the user may click on a graphical object 90 (here a picture of a robot) or other link to activate the profiling system 1. The system 1 displays the user's photographs 16, e.g., as a wall or other ordered arrangement, where images are sorted by categories. The most relevant categories may be shown first. The user may be given the opportunity to add photographs from other sources (such as the user's photo sharing accounts) to improve the profiling accuracy, e.g., by clicking on an icon 92. Once the system has finished processing the users' photographs, it may display a summary 94 of the user profile, e.g., based on the three (for example) most relevant categories.

The user may click on an icon 96 to access information about the categories and/or how the system 1 generated the summary.

The summary may be accessible to other viewers of the user's web page, so that the user's friends can see it and use the system on their own photos. The system allows a user to compare her profile with those of her friends by computing a similarity as described above. The similarity may be expressed numerically or as textual information selected by the system from a set of textual categories, such as "very similar," "almost twins," or the like.

The profiles can also be used in a game where the user tries to guess his own profile (e.g., his top three categories) or that of a friend.

Profile Matching and Application to Dating Sites and Online Communities

Dating sites often seek to match two people based on their profile, interests and tastes. To build this profile, they provide specific forms, personality tests and the like. Using the exemplary user profile 44, the accuracy of the profile built by the site could be automatically increased without requiring additional work from the user. By classifying the photos of its users into targeted categories, the site can use this additional information to improve a matching algorithm. For example, a person who has many pictures classified as outdoor activities (nature, hiking, mountain), is expected to more interested in people with the same kind of images than in those with very different profile.

By computing and maximizing matching scores between users, as described above, the site is able to show more relevant matches for its users.

This application may be expanded to any online community, to introduce other members of the community that have similar interests. For example, a photo sharing site may introduce a user to other members that have similar interests (e.g., butterfly photography, sunsets . . . ) based on their images.

In another embodiment, the user profile information is combined with geo location (GPS) information to compare people and match them by location. A user may run an application on a mobile device 12 or other computer to find people around her with a matching profile indicating similar interests. The user may be asked to define the radius of this area, e.g., to select from a set of radii (e.g., 1 mile, 10 miles, 100 miles, etc.) or select from a set of location-based regions of different size (such as from Times Square Area, Manhattan, N.Y., and US, where the user is identified as being in the Times Square Area). In other embodiments, the local area may be defined by default, based on the user's GPS location. The system 1 retrieves or generates the user's profile 44, compares it to the profiles 46 of other users that are detected as being in the specified area (e.g., through GPS signals from their own mobile devices or information posted on their web pages), and returns profiles of people located in this area ordered by decreasing profile similarity. To maintain the privacy of the user and/or the people identified as matches, the system may send a message to the matching people, without revealing their information to the user. The message may be in the form of a text message, email or the like. A matching person who responds may be provided with the user's contact information, such as mobile phone number, email address, web page information, or the like. The matching people may have agreed, in advance, to participate in such an interaction, e.g., through a dating site. In the case of a social network site, the message may be similar to a request for the user to become a "friend" with access to the matching person's web page. In this way, the user is not provided with a name or location of the matching people unless they chose to respond to the message.

Recommender Systems

Recommender systems attempt to recommend items (movies, TV program, music, books, news, images, web pages, holidays, friends, or the like) that are likely to be of interest to the user. The recommender system compares a user profile 44 to some reference characteristics, and predicts the rating that a user would give to an item they had not yet considered. If the rating is above a threshold, that item may be recommended to the user.

By classifying the user photos, the system 1 can build or complement a user profile in order to provide relevant recommendations. As an example, a tourism recommender system analyses user photos and classifies them into tourism-related categories or location categories (such as beach, monuments, nature, mountain, party, scuba diving, etc.). The system then proposes a vacation that matches the user's interest. If, for example, the user's profile shows that there is a relatively large proportion of landscape images in the user's collection, he may be recommended a particular type of travel package.

Assessing Online Reputation

Online users are often concerned about their reputation, and the image of themselves that they show to other users. The user's perception of his online profile may be significantly different from what the user's available data (e.g., photos) actually suggest.

By using the image classifier with a relevant categorization model on a user's images, an overview of the user's leisure or habits can be obtained, thus providing a prediction of the online perception and/or reputation of the user.

For example, the system may draw an inference from the user's profile and display it to the user as being the reputation of the user which the images would convey to viewers. The user then may decide to change some of the images in his collection to influence his reputation.

The system may provide recommendations to the users if it finds photos that belong to a category that could have a negative impact on the user's reputation.

Financial Applications

The user profile may find application in fraud detection, credit scoring, or insurance.

In one embodiment, the user's profile is used to assess the risk of ensuring the user. For example, if the user's profile indicates that the user is interested in extreme sports, then the insurance risk may be considered as high.

Profiling their users is also of value to financial institutions. There are several situations where profiling their users with their photos can provide relevant information to those institutions:

1. Fraud detection: Based on its customers' photos, a bank could detect behaviors that deviate from the standard, indicating potentially suspicious transactions (e.g., customers with low resources but expensive interests, such as yachting, skiing, or golfing).

2. Credit scoring: Banks try to minimize the risks in giving credit to their customers and often use credit scores based on customer's past financial dealings, such as payment of bills, credit card activity, and the like, as an indication of their creditworthiness. Analysis of the customer's photos could contribute to this score. For example, spending patterns could be extracted (e.g., expensive vacations).

3. Insurance: Classifying user photos provides hints as to a person's lifestyle and could be used, with additional data, by insurance companies to adapt the insurance premium. For example, a person whose profile indicated that he has risky hobbies (e.g., speleologist, parachutist, car racer) may benefit from specific insurance. The exemplary method may be used to implement an interactive system run by the insurance company that analyses user photos and proposes suitable insurance options. It may also be used to detect potential fraud as described above (e.g., the user declared he did not practice a risky sport, but has many images that are classified as representing this sport).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An advertising method comprising:
   providing an advertising template for an advertising sponsor;
   storing a set of user's images uploaded by a user device to a remote server:
   with a computer processor,
   providing for communicating between the remote server and the user device:
   selecting an advertising image based on the set of the user's images, the selected advertising image being derived from one of the user's images, the selecting including:
   a) training a classifier on computed image signatures of a labeled set of training images, the computed image signatures being based on pixels of the respective training image by extracting features from patches of the image, the labels being selected from a finite set of image categories;
   b) categorizing the set of the user's images with the trained classifier into the finite set of image categories, based on computed image signatures of the images in the set, the image signatures being based on pixels of the respective user's image by extracting features from patches of the image;
   c) selecting the advertising image based on the classifier having been trained on the computed image signatures of the labeled set of training images;
   generating advertising content to be displayed to a user viewing a web page on the user device, including combining the template with the selected advertising image to create the advertising content, the advertising content being personalized for each user; and providing for displaying the advertising content to the user on the web page, the displayed advertising content comprising a link to the sponsor's web page which is actuatable by the user.

2. The method of claim 1, wherein the displayed advertising content references at least one of the advertising sponsor, the advertising sponsor's product, and an advertising sponsor's service, in at least one of the displayed content and the sponsor's web page linked thereto.

3. The method of claim 1, wherein the advertising template comprises a logo which is positioned over the selected user's image.

4. The method of claim 3, wherein the logo positioned over the selected user's image comprises at least one of the sponsor's logo and a logo for a product or service offered by the sponsor.

5. The method of claim 1, wherein the user's images comprise photographs.

6. The method of claim 1, further comprising generating a user profile based on the set of user images, the image for the advertising content being selected based on the user profile.

7. The method of claim 6, wherein the user profile represents a distribution of the user's images over a finite set of categories.

8. The method of claim 6, wherein the selected image is one of the user's images, which selected based on the user profile.

9. The method of claim 8, wherein the selection of the user's image is also based on a comparison measure between each of a set of images in a predominant category and at least one of a set of the advertising sponsor's images.

10. The method of claim 6, wherein the selected image is a sponsor's image which is selected based on the user profile.

11. The method of claim 6, further comprising selecting the template for the advertising content from a set of templates or selecting from variable data for a template, based on the user profile.

12. The method of claim 1, wherein the categorizing comprises computing a signature for each image in the set of user images and categorizing the images in the set of user images into one or more of the finite set of categories, based on the computed signatures.

13. An advertising method comprising:

providing an advertising template for an advertising sponsor;

storing a set of user's images uploaded by a user device to a remote server:

with a computer processor, providing for communicating between the remote server and the user device:

selecting an advertising image based on the set of the user's images, the selected advertising image comprising one of a sponsor's images, the selecting comprising:

a) categorizing the set of the user's images on the remote server into a finite set of image categories, based on image content of the images in the set comprising computing a signature for each image in the set of user images based on extracted visual features of the respective image and categorizing the images in the set of user images into one or more of the finite set of categories, based on the computed signatures;

b) computing a signature for each of a set of sponsor's images based on extracted visual features of the respective image;

c) computing a comparison measure between the sponsor's images and a set of the user's images that are in a predominant category identified in the categorization, the advertising image being selected based on the computed comparison measure;

generating advertising content to be displayed to a user viewing a web page on the user device, including combining the template with the selected advertising image to create the advertising content, the advertising content being personalized for each user; and providing for displaying the advertising content to the user on the web page, the displayed advertising content comprising a link to the sponsor's web page which is actuatable by the user.

14. The method of claim 1, wherein the providing an advertising template comprises providing a plurality of advertising templates, the method further comprising selecting one of the plurality of templates for the advertising content based on the categorization.

15. The method of claim 1, wherein the webpage comprises the user's page on a social networking site.

16. The method of claim 15, further comprising providing a profile of the user to the user, based on the predominant categories identified in a categorization of the user's images.

17. The method of claim 1, wherein there are at least three categories.

18. An advertising system comprising:

memory which stores an advertising template for an advertising sponsor;

memory which stores:

a categorizer for categorizing a set of a user's images, based on image content, the categorizer including at least one classifier which has been trained on image signatures of a labeled set of training images, the labels being selected from a finite set of image categories, the image signatures for the user's images and training images being based on pixels of the respective image by extracting features from patches of the image;

a comparison computing component for selecting an advertising image based on the categorization of the user's images, the advertising image being selected from a set of advertising images categorized by the categorizer; and a combining component for combining the template with the selected advertising image to create personalized advertising content for each user which is displayable to the user on a web page viewed by the user; and a computer processor which implements the categorizer, comparison computing component, and combining component.

19. The advertising system of claim 18, further comprising a profile generator stored in memory configured for generating a profile of a user based on the categorization of the set of user's images, each of images being tagged by the categorizer, a respective image being ranked or scored based on whether the category assigned by the categorizer is a high scoring category in the user's profile.

20. A method comprising:

for a user viewing a web page, categorizing a set of the user's images based on image content of the images in the set, with at least one classifier which has been trained on a finite set of image categories;

generating a user profile using the categorized set of user's images, the generated user profile representing a distribution of the user images over a set comprising at least three of the categories;

with a computer processor, performing at least one of:
a) selecting an image for an advertisement to be displayed to the user on the web page, based on the user profile;
b) displaying information to the user based on the user profile;
c) comparing the user profile with a user profile for at least one other user and outputting a decision based on the comparison, wherein the decision is optionally based on a GPS location of at least one of the user and the at least one other user;
d) using the profile in a recommender system to make recommendations to the user; and
e) making a financial decision based on the user profile.

* * * * *